(12) United States Patent
Schuth et al.

(10) Patent No.: US 12,222,198 B2
(45) Date of Patent: Feb. 11, 2025

(54) OPTICAL MEASUREMENT DEVICE AND MULTIPLE MIRROR

(71) Applicant: HOCHSCHULE TRIER, Trier (DE)

(72) Inventors: Michael Schuth, Riol (DE); Christopher Petry, Trier (DE)

(73) Assignee: HOCHSCHULE TRIER, Trier (DE)

( * ) Notice: Subject to any disclaimer, the term of this patent is extended or adjusted under 35 U.S.C. 154(b) by 530 days.

(21) Appl. No.: 17/431,327

(22) PCT Filed: Feb. 12, 2020

(86) PCT No.: PCT/DE2020/100094
§ 371 (c)(1),
(2) Date: Aug. 16, 2021

(87) PCT Pub. No.: WO2020/164667
PCT Pub. Date: Aug. 20, 2020

(65) Prior Publication Data
US 2022/0049952 A1 Feb. 17, 2022

(30) Foreign Application Priority Data
Feb. 14, 2019 (DE) .................. 10 2019 103 814.6

(51) Int. Cl.
*G01B 11/24* (2006.01)
*G02B 26/00* (2006.01)

(52) U.S. Cl.
CPC ........ *G01B 11/2441* (2013.01); *G02B 26/001* (2013.01)

(58) Field of Classification Search
CPC ............ G01B 11/2441; G01B 2290/70; G01B 9/02091; G02B 26/001; G02B 26/06; G01M 11/0271
See application file for complete search history.

(56) References Cited

U.S. PATENT DOCUMENTS

| 4,362,361 A | 12/1982 | Campbell et al. |
| 7,042,577 B1 * | 5/2006 | Jacob ............... G01N 21/45 356/237.4 |
| 2004/0047055 A1 * | 3/2004 | Mizrahi .............. G02B 5/3041 359/883 |

(Continued)

FOREIGN PATENT DOCUMENTS

DE 10 2013 212 685 A1 12/2014

OTHER PUBLICATIONS

Aug. 7, 2020 Written Opinion of the International Search Authority issued in International Patent Application No. PCT/DE2020/100094.

(Continued)

*Primary Examiner* — Uzma Alam
*Assistant Examiner* — Jonathon Cook
(74) *Attorney, Agent, or Firm* — Oliff PLC (57) ABSTRACT

A multiple mirror for multiplying a single incident wavefront of electromagnetic radiation into a plurality of outgoing wavefronts, including at least one first mirror, onto which the incident wavefront first falls, and a second mirror, on which the wavefront is last reflected, wherein the mirror planes are superimposed in the direction of movement of the first wavefront. The first mirror is partially transparent to the electromagnetic radiation and the second mirror is fully reflective.

18 Claims, 4 Drawing Sheets

(56) References Cited

U.S. PATENT DOCUMENTS

2014/0320865 A1* 10/2014 Knüttel ................ G03H 1/0465
356/495
2015/0338209 A1* 11/2015 Knüttel .............. G01B 9/02027
356/51
2016/0011523 A1* 1/2016 Singh ................. G01N 21/4788
355/77
2018/0283852 A1* 10/2018 Ser ..................... G01B 9/02044

OTHER PUBLICATIONS

Aug. 7, 2020 Search Report issued in International Patent Application No. PCT/DE2020/100094.

* cited by examiner

OPTICAL MEASUREMENT DEVICE AND MULTIPLE MIRROR

The invention relates to a multiple mirror for multiplying an incident wavefront according to the preamble of Claim 1. The invention further relates to a device for optically measuring a surface according to the preamble of Claim 6.

A method for measuring the phase of radiation, particularly light radiation, and a device for measuring the phase of radiation, particularly light radiation, are known from DE 198 56 400 B4 and DE 010 30 059 B1. In the case of the known devices, a body is irradiated with coherent radiation at a predetermined frequency. The body may have a diffusely reflective surface. The radiation reflected by the body, or the radiation that has passed through the body or transparent medium, is projected by an imaging optical system into an image plane in which a sensor is located. The sensor is preferably a surface sensor. The surface sensor may be part of a framing camera that is equipped with corresponding lens optics.

The known construction consists of multiple parts and is space consuming. The construction is large and comprises many components and lenses. As a consequence, the known construction is expensive and complex. Moreover, the known construction only offers the capability of measuring a small area which is heavily shaded by the diaphragm. Furthermore, the quality of the image is dependent on the measurement direction.

An object underlying the invention is that of creating a device which enables the construction size to be reduced while at the same time decoupling the quality of the results from the measurement direction.

This object is solved according to the invention by the features of the independent claims. Inventive refinements and alternatives are described in the dependent claims.

A multiple mirror is proposed, by means of which an incident wavefront of electromagnetic radiation is multiplied, so that after the reflection of the radiation a plurality of wavefronts emanate from the multiple mirror. The electromagnetic radiation propagates in the form of waves, each wave having a wavefront directed in a direction of propagation. The wavefronts have a phase shift relative to each other. Therefore, at least one first mirror, which the incident wavefront hits first, and a second mirror, on which the wavefront is last reflected, are provided in the multiple mirror. The mirrors are superimposed in the direction of movement of the first wavefront. To ensure that the wavefront can reach the second mirror despite the superimposed condition in the direction of propagation of the incident radiation, the first mirror is partially transparent for the electromagnetic radiation, whereas the second mirror is fully reflective. In this way, part of the incident electromagnetic radiation is reflected on the first mirror, while the other part of the incident radiation propagates to the second mirror. There, the remaining radiation is also reflected, but with a time delay relative to the first reflection. The time delay causes a phase shift between the two reflected radiation portions. If a plurality of multiple mirrors are combined with each other, for example, the phase shifts may be added together and used for interferometry purposes. The construction in which multiple mirrors are arranged together in a sandwich-like manner enables an extremely compact design, so that the multiple mirror is ideally suited for use in portable measuring devices, particularly outside of a laboratory. The multiple mirror may preferably be used in a device for shearography.

In order to enable particularly efficient detection of the contours of an object that is to be measured, at least one of the mirrors may be able to polarize the electromagnetic radiation. For this purpose, preferably the first and the second mirror may polarize the radiation in different directions, which may preferably be aligned orthogonally to each other. For example, if a beam with mixed polarizations falls on the multiple mirror, a portion of the radiation with a uniform polarization direction may be polarized by the first mirror, while a second portion with different polarization is allowed to pass through to the second mirror. The second portion may be reflected at the second mirror. The second mirror may be a simple, non-polarizing mirror. Alternatively, the second mirror may also have a polarizing effect, in particular orthogonally to the first mirror. Finally, in each case two differently polarized beams emerge from the multiple mirror. When a multiple mirror or a plurality of multiple mirrors is used, the outgoing beams can be superimposed on each other, wherein the beams with the same polarization interfere with each other. When one multiple mirror is used, one of the two polarized wavefronts (reflected by the multiple mirror) interferes with the correspondingly polarized portion of the simple wavefront which is reflected by the simple mirror. The resulting images may be evaluated regarding the composition of the object to be measured.

Advantageously, at least one of the mirrors may be tilted with respect to the at least one further mirror. A distance between the mirror planes of the mirrors may be varied. The distance between the mirror planes may be kept constant or varied in terms of location and/or time. The radiation is reflected directly on the mirror plane. The distance causes the phase shift, so highly precise measurements can be carried out using a device equipped with such a multiple mirror. When using a multiple mirror or a plurality of multiple mirrors, the images produced by interference can be influenced by the tilting. When one multiple mirror is used, one of the two polarized wavefronts (reflected by the multiple mirror) interferes with the correspondingly polarized portion of the simple wavefront which is reflected by the simple mirror. They can also be shifted with respect to each other in the image plane.

It is preferred to design the mirrors flat. Such plane mirrors may be tilted relative to each other, so that the mirrors enclose an angle. Thus, the angle of incidence and the angle of reflection of the electromagnetic radiation deviate from one another at the first mirror and second mirror. This makes it possible to adjust a phase shift on the reflected wavefronts.

The mirrors can advantageously be adjusted relative to each other in a simple manner in that the first mirror is rotatable about an axis of rotation, which is located for example in a frame of a mirror holder of the mirrors. The axis of rotation may extend through the mirror plane, for example, or it may be located in front of or behind the mirror plane. The mirror is preferably rotated out of a position parallel to the second mirror until it is aligned at a desired angle with the second mirror. A further axis of rotation of such kind may be implemented on the second mirror. Both mirrors may have such an axis of rotation. Alternatively, only one of the two mirrors may have such an axis of rotation. For example, the first or the second mirror may be equipped with an axis of rotation.

A device for optical measurement of a surface with a preferably coherent light source such as a laser, which emits an electromagnetic beam, may comprise at least one beam splitter. The beam splitter may be a composite two-part prism made from a material that is transparent to radiation. In particular, the device is an interferometer, which measures the surface interferometrically. In order to achieve a compact design of the device and still obtain maximum measurement accuracy even in harsh environmental conditions, at least one multiple mirror comprising at least two mirror planes arranged at a distance from each other is positioned in front of and/or behind the beam splitter in the direction of propagation of the electromagnetic beam. Such a device is ideal for use in environments that are exposed to vibrations. Moreover, it is largely insensitive by temperature and hygroscopic fluctuations.

At least one diaphragm may be provided between the multiple mirror and the beam splitter for the enhancement of the device. The measurement accuracy is further improved thereby. In addition the diaphragm is advantageously usable to enable spatial phase shifting.

Increased measurement accuracy can be achieved if the device comprises two beam splitters, two shutters and two multiple mirrors. In this way, light reflected from a surface of an object to be measured can be analyzed interferometrically when the light is directed through such a device.

When using the multiple mirrors, a mirror plane for the electromagnetic radiation may be partially transparent. In particular, at least one of the multiple mirrors is equipped with a mirror that is tiltable relative to a further mirror. A wavefront hitting the multiple mirror is then divided into two outgoing wavefronts that are phase-shifted with respect to each other. It is particularly preferred to provide two multiple mirrors that comprise tiltable mirrors.

An advantageous development comprises at least one diaphragm which has an aperture with a polarization filter. The polarization filter can be used to filter reflected beams and to remove disruptive incorrect polarizations.

Such corrected beams are particularly suitable for interferometric measurements. Optimal results can be achieved here if at least one diaphragm has two apertures, each of which has a polarization filter, which are preferably aligned orthogonally to each other. In this way, two beams multiplied by a multiple mirror can each be passed through one aperture and filtered correspondingly. After passing through the filters which are aligned orthogonally to each other, the beams then have corresponding polarizations.

In addition or alternatively to the polarization filters, at least one diaphragm has an aperture that contains a frequency filter, so that only certain wavelengths can pass through the diaphragm.

To ensure that the device guarantees optimum measurement in all spatial extension directions of the specimen, the diaphragm may be designed as a grating diaphragm. The grating diaphragm preferably has a slit width of the apertures which is specified in two dimensions. By limiting the slit width in the plane of the diaphragm, it is possible to influence the measurement radiation in two dimensions by means of the beam geometry.

A color camera is particularly advantageous for analyzing different wavelengths. The color camera records the electromagnetic radiation which has passed through the at least one multiple mirror, wherein the color camera is able to differentiate between the different wavelengths.

In one embodiment, the device comprises a beam splitter which is located first to face the electromagnetic radiation in the direction of propagation. Upon entering the device, the beam enters into the beam splitter. The beam is then split in the beam splitter and directed onto the movable mirror in a first direction of propagation. In a second direction of propagation, the remaining beam from the split beam is directed onto a fixed mirror. A diaphragm is respectively located between the beam splitter and each of the two mirrors. The respective split beam passes through each diaphragm at least twice, and the beam is merged again in the beam splitter. A virtual double-slit is visible from the direction of a camera. With this simple configuration, it is possible to create a robust and space-saving device ensuring a high degree of portability.

According to a further development, the device comprises a further, second beam splitter, a mirror and a movable mirror, wherein the two beam splitters are located in a diagonal alignment with respect to each other. An imaginary diagonal may be drawn through some of the corners of the beam splitters, one mirror being located on each of the two sides of the diagonal alignment of the beam splitters. The mirrors are aligned substantially parallel to the imaginary diagonal through the beam splitters. One diaphragm each is located between the beam splitter second entered by the beam, that is entered by the partial beams from the first beam splitter, and the mirrors. The diaphragms are substantially parallel to the sides of the beam splitter, where the beam reflected by the mirrors enters. Of course, the diaphragms may also be located anywhere in the beam path of the two beam splitters, before or after the mirrors.

It is understood that features described in the preceding text and still to be explained in the following text are usable not only in the respectively specified combination, but also in other combinations. The scope of the invention is defined solely by the claims.

In the following text, the invention will be explained in more detail on the basis of an exemplary embodiment and with reference to the associated drawings.

Figure 1:
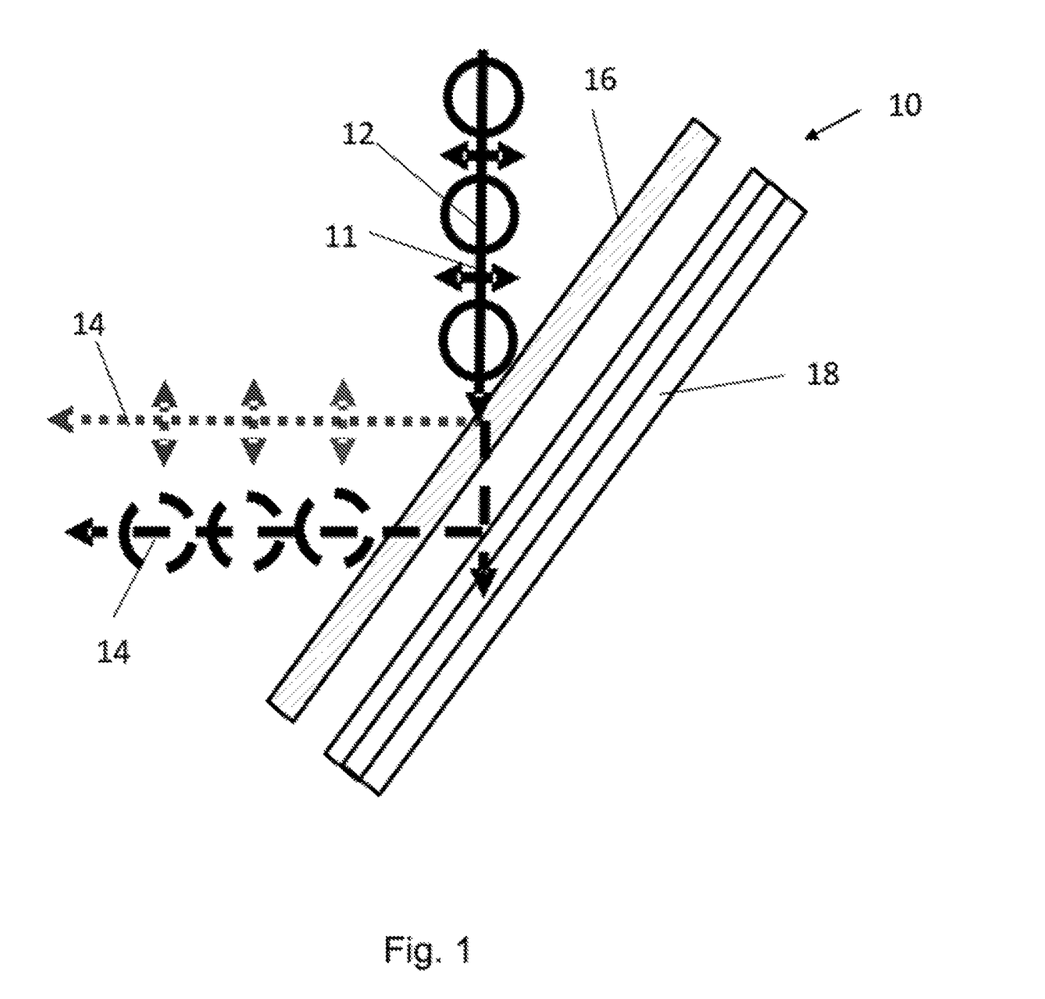
FIG. 1 shows a multiple mirror with various outgoing beams.

FIG. 1 shows a multiple mirror 10, which reflects electromagnetic radiation 11. The radiation 11 may consist of coherent waves, as is the case with a laser, for example. The multiple mirror 10 multiplies an incident wavefront 12 of the radiation 11, with the result that a plurality of wavefronts 14 emerge from the multiple mirror 10 after reflection. The wavefront is multiplied by two mirrors 16, 18 which are located parallel to each other and are aligned so as to overlap each other in the direction of propagation of the incident and reflected radiation 11. The mirrors 16, 18 have mirror planes on which the reflection takes place. The mirrors 16, 18 are also spaced from each other in the direction of propagation. Additionally, the first mirror 16 on which the radiation 11 hits in the direction of propagation is partially transparent for the electromagnetic radiation 11, whereas the second mirror 18 is fully reflective.

Now if an incident wavefront 12 hits on the first mirror 16, a portion thereof is reflected and sent back. Here, the angle of incidence corresponds to the angle of reflection relative to the mirror plane. The remaining portion is reflected at the mirror plane of the second mirror 18. Since the mirrors 16, 18 are spaced apart from one another, a certain period of time elapses between the first reflection and the second reflection, so the reflection on the first mirror 16 takes place before the reflection on the second mirror 18. This results in a phase shift between the two outgoing wavefronts 14 from the first and second reflection.

The incident beam 11 is polarized in different directions. The mirrors 16, 18 may be designed in such a manner that the reflected radiation is only polarized in one direction. The two mirrors 16, 18 are able to polarize the radiation 11 in two directions, which are orthogonal to each other. The respective radiation 11 reflected at each of the mirrors 16, 18 is only polarized in one direction. Alternatively, for example only the first mirror 16 may have a polarizing effect, wherein the reflected portion of the radiation 11 has a uniform polarization. The remaining component of the radiation 11 advances as far as the second mirror 18 and has an orthogonal polarization. This second component may be reflected on the second mirror 18, wherein the second mirror 18 has no polarizing property. Nevertheless, the second component emerges polarized from the multiple mirror 10.

Figure 2:
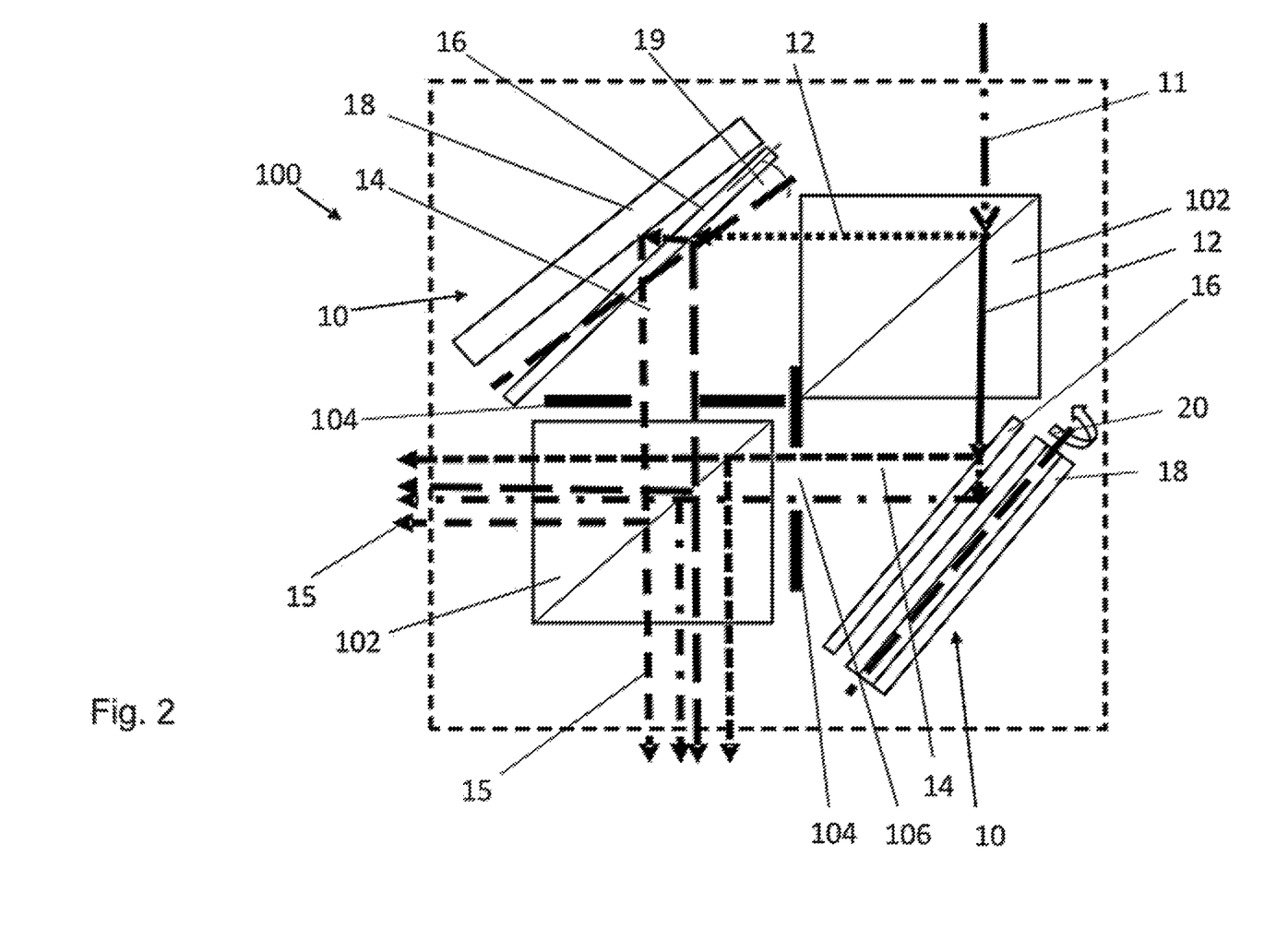
FIG. 2 shows a device for optical measurement of a surface by means of multiple mirrors.

FIG. 2 shows a device 100 for optical measurement of a surface which comprises two multiple mirrors 10, two beam splitters 102 and two diaphragms 104. The incident beam 11 is generated by irradiating the surface to be measured with a coherent light. The coherent light may be a laser, for example. When a multiple mirror or two multiple mirrors 10 are used, the phase-shifted outgoing wavefronts 14 from the individual multiple mirrors 10 are added together, and the radiation 14 reflected by the mirrors 16, 18 can interfere with each other. When one multiple mirror is used, one of each of the two polarized wavefronts (reflected by the multiple mirror) interferes with the correspondingly polarized portion of the simple wavefront which is reflected by the simple mirror.

The radiation 11 that is reflected by the surface to be measured first enters a beam splitter 102. The beam splitter 102 may have a rectangular cross-section, wherein the incident beam 11 impinges on a flat side of the beam splitter 102, which in particular does not face any of the multiple mirrors 10. After the beam 11 has entered the first beam splitter 102 and the beam 11 is split into two further beams 12, the wavefronts 12 of which each impinge on a multiple mirror 10, the beams 12 are again doubled by the multiple mirrors 10. The wavefronts 14 emerging from the respective multiple mirror 10 are directed towards the second beam splitter 102. The respective doubled and phase-shifted wavefronts 14 pass through diaphragms 104, which are each located on the flat side of the second beam splitter 102. Alternatively, the diaphragms 104 may be located anywhere in the respective beam path between the first beam splitter 102 and the second beam splitter 102. In the second beam splitter 102, the outgoing, phase-shifted beams 14 coming from the multiple mirrors 10, are doubled again, so that two wavefronts 15, each with the same phase, are directed towards a camera. The beams from the two multiple mirrors 10 are merged and split into two bundles, which each exits on one side of the beam splitter 102. The beams 14 interfere with each other during merging and form an interference image which can be spectrally decomposed, by Fourier analysis, for example.

The two beam splitters 102 are located in a row along a diagonal relative to the beam paths entering and exiting the multiple mirrors 10. The multiple mirrors 10 are located approximately between the beam splitters 102 to the left and right of the beam splitters 102. The two diaphragms 104 are located on the flat side of the second beam splitter 102, facing the first beam splitter 102. Alternatively, the diaphragms 104 may be in any position on the respective beam path between the first beam splitter 102 and the second beam splitter 102. The two diaphragms 104 are approximately perpendicular to each other. The diaphragms 104 may also be positioned at an angle not perpendicular to each other.

The multiple mirrors 10 each comprise two mirrors 16, 18, one of the mirrors 16, 18 each having an axis of rotation. For example, the first mirror 16 and/or the second mirror 18 may have an axis of rotation. One multiple mirror 10 may also have a rotatable first mirror 16 and the other multiple mirror 10 may have a rotatable second mirror. The axes of rotation can be aligned perpendicular to each other. The rotation of the mirror 16, 18 may be used to produce a phase shift of the multiplied beams 14. The phase shift is dependent on the angle 19 that is set between the two mirrors 16, 18 by the rotation. The displacement of a mirror may also cause shearing of the radiation 12. The respective interference images of the polarized beams from the first and second mirrors 16, 18 of the two multiple mirrors 10 may be shifted with respect to each other by the rotation. The axis of rotation is implemented in a frame of the multiple mirror 10, for example.

Through the second beam splitter 102, the single-slit diaphragms 104 are visible on the outgoing flat sides of the second beam splitter 102 as a virtual double-slit diaphragm, since the two phase-shifted beams from the respective multiple mirror 10 are merged again after passing through the respective diaphragm 104. The double-slit spacing requires a spatial carrier frequency for the phase shifting in space. The carrier frequency is thereby decoupled from the rotational positions of the mirrors 16, 18.

The mirrors 16, 18 polarize the radiation 12 in different directions depending on the reflection. For example, the partially transparent first mirror 16 can only reflect radiation 12 with a specific polarization, so that the radiation 12 which is able to pass through is reflected by the second mirror 18. In this situation, the radiation 12 may be polarized in the same direction by the two first mirrors 16. The reflected beams 14 with the same polarization direction are capable of interfering with each other. In the same way, the beams 14 from the second mirror can also be polarized in the same direction. Consequently, they are also able to interfere with each other. In contrast, the beams 14 from the first mirror cannot interfere with the beams 14 from the second mirror, since they are polarized in a different direction. Now if the first polarizing mirror 16 of the one multiple mirror 10 is tilted relative to the first polarizing mirror 16 of the other multiple mirror 10, an interference image is created by the reflected beams 14. This image may be understood as a sheared image. For example, it may be sheared horizontally, which allows shearographic measurement. Independently of this, the second mirror 18 of the one multiple mirror 10 may be tilted towards the second mirror 18 of the other multiple mirror 10, thereby producing another sheared image through the interference of the reflected beams 14. Shearing may take place vertically, for example.

In this way, a horizontally sheared wavefront 14 and an associated reference wavefront as well as a vertically sheared wavefront and an associated reference wavefront are generated by the two multiple mirrors 10. Thus, the use of the diaphragms 104 generates carrier frequencies for the respective wavefronts which are polarized in a manner capable of interference in the respective horizontal and vertical directions. This results in separate spectra in the Fourier space.

Both images generated by the interference between the pairs of beams 14 reflected from the first and second mirrors 16, 18 are captured by a camera. For the independent evaluation of the two sheared images, their polarizations may be used as a separation criterion. This may be achieved by the use of different spatial carrier frequencies according to polarization, for example. For this purpose, the two diaphragms 104 may have polarization-specific apertures 106. The width of the apertures 106 in the diaphragms 104 determine the frequency width of the image produced by interferometry proportionally in a Fourier analysis. The aperture 106 may be equipped with a polarization filter.

Additionally or alternatively thereto, the aperture 106 may be equipped with a frequency filter which only allows a certain wavelength of the radiation 14 to pass through. Measurement accuracy is improved by filtering certain wavelengths, since the aperture size may be adjusted to just one single wavelength, for example. Image errors are avoided thereby. A color camera enables the filtered interference images from different wavelengths to be analyzed. A frequency filter may be generated by color filters, for example.

Figure 3:
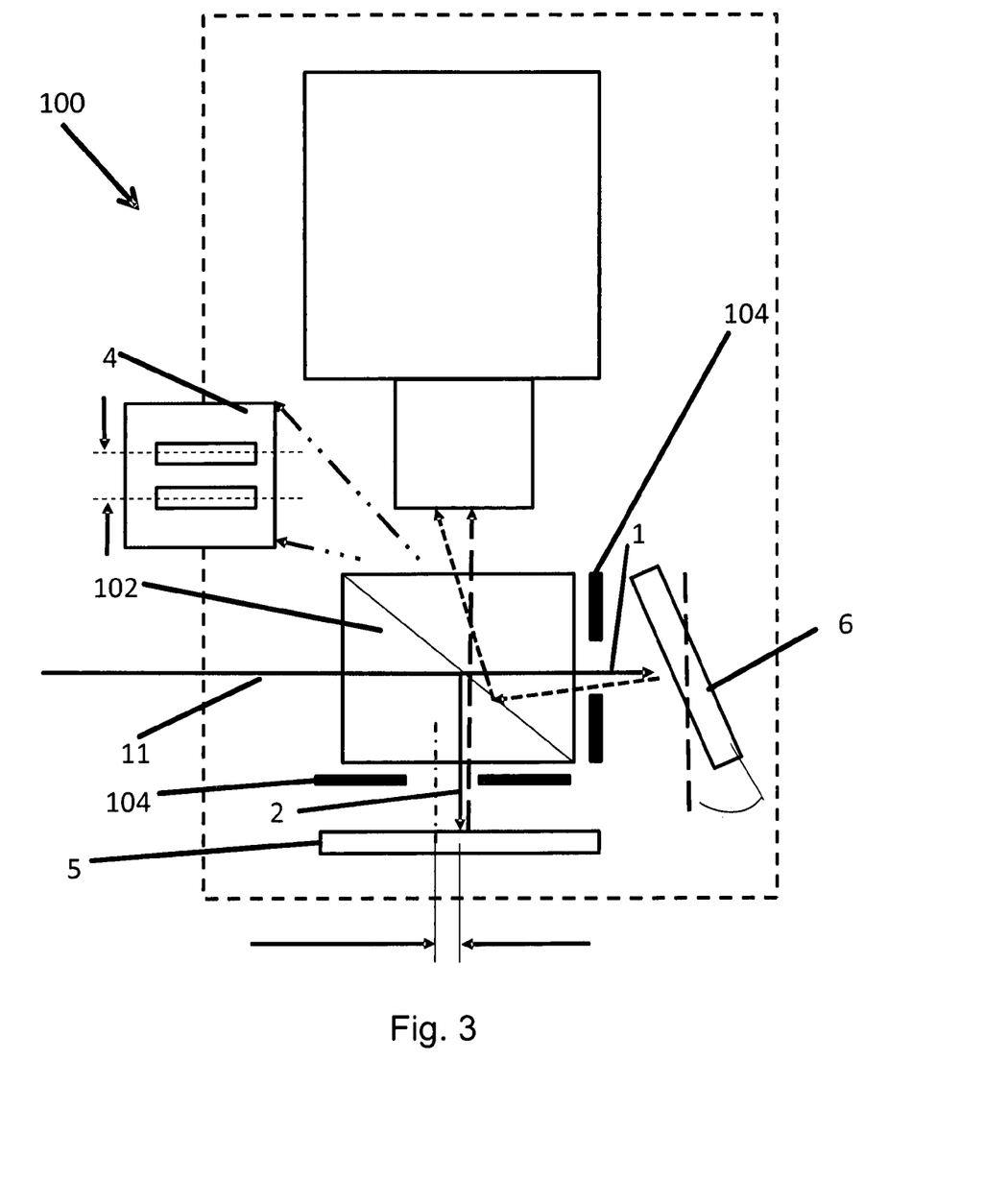
FIG. 3 shows an embodiment with a beam splitter, a fixed mirror and a movable mirror.

FIG. 3 shows a device 100 comprising a beam splitter 102 which is arranged in the direction of propagation of the electromagnetic beam 11, and onto which the beam 11 enters first. Upon entering the device, the beam 11 passes into the beam splitter 102 and is split in the beam splitter 102. One portion of the beam 11 is directed in a first direction of propagation 1 towards the movable mirror 6. In a second direction of propagation 2, the remaining beam of the split beam 11 is guided onto a fixed position mirror 5. A diaphragm 104 is respectively arranged between the beam splitter 102 and each of the two mirrors 6, 5. The respective partial beam obtained through the beam splitter 102 passes through each diaphragm 104 at least twice, the partial beam passing through the diaphragm 104 once before the reflection and once after the reflection on the respective mirror 6, 5. The partial beams are merged again in the beam splitter 102 and directed to a camera. A virtual double-slit 4 is visible from the direction of the camera.

Figure 4:
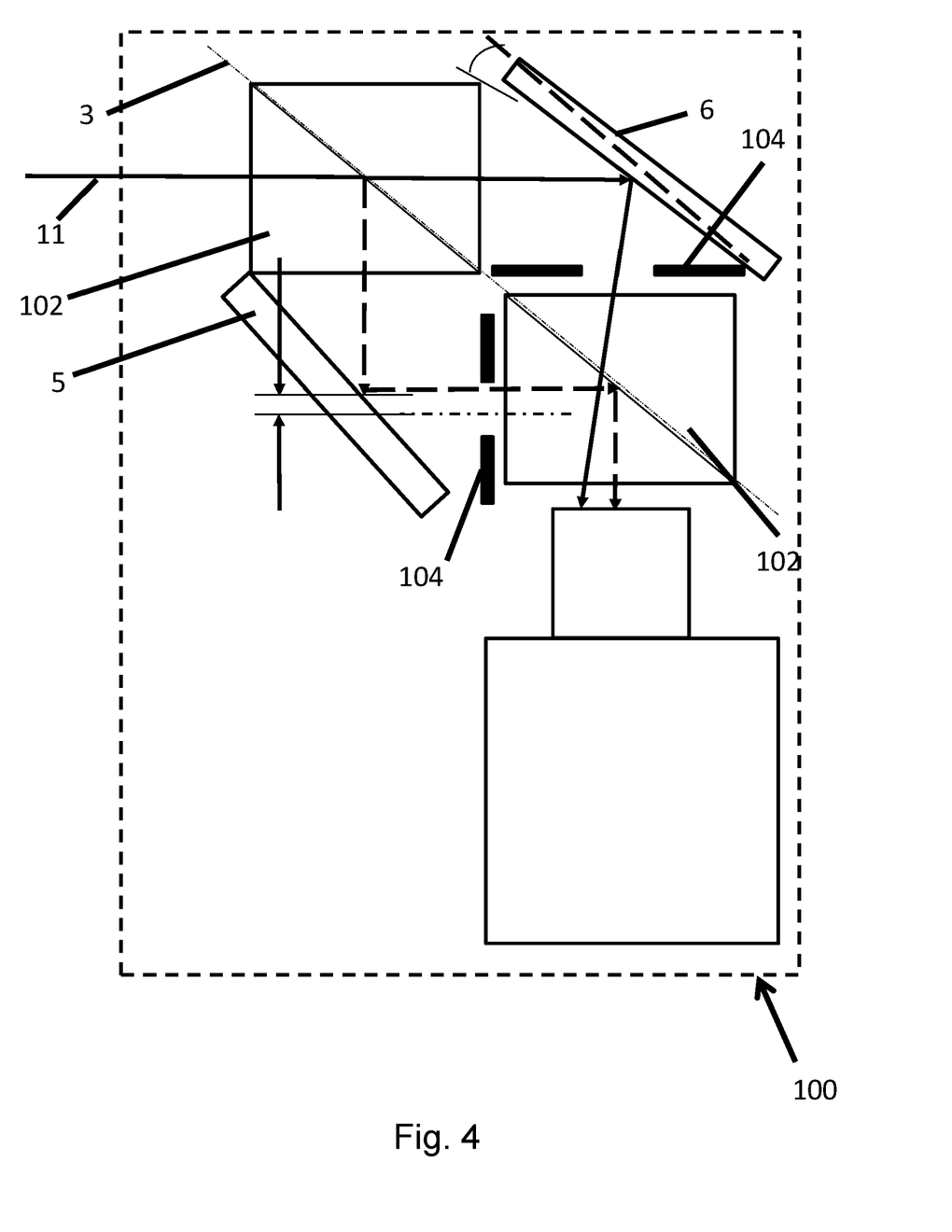
FIG. 4 shows an embodiment with two beam splitters, a fixed mirror and a movable mirror.

FIG. 4 discloses a further development which comprises further, second beam splitter 102. A mirror 5 and a movable mirror 6 are also part of the device 100, wherein the two beam splitters 102 are located in a diagonal alignment with respect to each other. An imaginary diagonal 3 may be laid through a part of the corners of the beam splitters, so that some of the corners of the beam splitters 102 are aligned with each other. One mirror 6, 5 is located on each of the two sides of the diagonal alignment of the beam splitters 102. The mirrors 6, 5 are aligned substantially parallel to the imaginary diagonal 3 through the beam splitters 102. The movable mirror 6 may deviate from the parallel alignment by an adjustment angle, but it may be reset to a parallel position. A diaphragm 104 is located between the beam splitter 102 the beam 11 enters second, that is to say the partial beams from the first beam splitter 102, and each of the mirrors 5, 6. The diaphragms 104 are substantially parallel to the sides of the beam splitter 102 into which the beam 11 reflected by the mirrors 5, 6 enters.

LIST OF REFERENCE NUMERALS

1 First direction of propagation
2 Second direction of propagation
3 Diagonal
4 Virtual double-slit
5 Fixed mirror
6 Movable mirror
10 Multiple mirror
11 Electromagnetic radiation
12 Incident wavefront
14 Outgoing wavefronts
15 Wavefronts towards camera
16 First mirror
18 Second Mirror
19 Angle
20 Axis of rotation
100 Device
102 Beam splitter
104 Diaphragms
106 Aperture

The invention claimed is:

1. A device for interferometric, optical measurement of a surface, comprising
   a coherent light source emitting an electromagnetic beam;
   two beam splitters;
   two diaphragms each located on a flat side of one of the two beam splitters;
   a multiple mirror with two distanced mirrors, comprising a first mirror to which the incoming beam hits first, and a second mirror at which the beam is reflected last, wherein the mirrors are superimposed in the direction of motion of the first wavefront and wherein the first mirror is partially transparent for the electromagnetic beam and the second mirror is fully reflective; and
   whereby the beam splitters and the multiple mirror are arranged in such a manner that the electromagnetic beam hits the first beam splitter, is directed from the first beam splitter to the multiple mirror and then hits the second beam splitter;
   wherein a diaphragm of the two diaphragms is arranged in the beam path between the two beam splitters in such a manner that the beam passes through the diaphragm; and
   wherein a mirror of the multiple mirror is tiltable compared to the other mirror in such a manner that the mirrors enclose an angle and that a wavefront hitting the multiple mirror is divided into two outgoing wavefronts that are phase-shifted with respect to each other.

2. The device according to claim 1, comprising a second multiple mirror, wherein the electromagnetic beam hits the first beam splitter, is divided by the first beam splitter in two partial beams with different propagation directions and each partial beam is directed to one of the multiple mirrors and then both partial beams meet the second beam splitter,
   wherein one diaphragm is arranged in each of the beam paths between the two beam splitters in such a manner that each partial beam passes through one of the diaphragms.

3. The device according to claim 1, wherein the mirrors of the multiple mirror are flat.

4. The device according to claim 1, wherein the first and/or second mirror of the multiple mirror are rotatable around a rotation axis.

5. The device according to claim 4, wherein the first and/or second mirror of the multiple mirror are mounted in a mounting-frame of the mirrors.

6. The device according to claim 2, wherein one multiple mirror has a mirror which is tiltable over the other mirror in the one multiple mirror and the other multiple mirror has a mirror which is rotatable against the other mirror in the other multiple mirror by a rotation axis.

7. The device according claim 1, wherein the first mirror polarizes the electromagnetic radiation.

8. The device according claim 7, wherein the first mirror reflects radiation of a certain polarization and transmit a different polarization.

9. The device according to claim 1, wherein a camera records the electro-magnetic beam reflected by the multiple mirror.

10. The device according to claim 9, wherein the camera is a color camera having a camera sensor configured to detect more than one wavelength of electromagnetic beams.

11. The device according to claim 1, wherein at least one diaphragm has an aperture.

12. The device according to claim 11, wherein the aperture comprises a polarization filter or a frequency filter that allows only certain wave-lengths to pass through the diaphragm.

13. The device according to claim 1, wherein at least one diaphragm has two apertures.

14. The device according to claim 13, wherein the two apertures each have a polarization filter, which are orthogonally aligned to each other.

15. The device according to claim 1, wherein one diaphragm is designed as a grating diaphragm with apertures.

16. The device according to claim 15, wherein the apertures have in two dimensions certain slit widths wherein the slit widths have the same dimensions.

17. A device for interferometric, optical measurement of a surface, comprising
a coherent light source emitting an electromagnetic beam;
two beam splitters;
two diaphragms;
a single mirror;
a multiple mirror with two distanced mirrors, comprising a first mirror to which the incoming beam hits first, and a second mirror at which the beam is reflected last, wherein the mirrors are superimposed in the direction of motion of the first wavefront and wherein the first mirror is partially transparent for the electromagnetic beam and the second mirror is fully reflective;
whereby the beam splitters, the single mirror and the multiple mirror are arranged in such a manner that the electromagnetic beam hits the first beam splitter, is divided by the first beam splitter in two partial beams with different propagation directions;
wherein the first of the two partial beams is directed to the multiple mirror and then hits the second beam splitter, and the second of the two partial beams is directed to the single mirror and then hits the second beam splitter;
wherein one diaphragm is arranged in each of the beam paths of the partial beams between the two beam splitters in such a manner that each partial beam passes through one of the diaphragms; and
wherein a mirror of the multiple mirror is tiltable compared to the other mirror in such a manner that the mirrors enclose an angle and that a wavefront hitting the multiple mirror is divided into two outgoing wavefronts that are phase-shifted with respect to each other.

18. A device for interferometric, optical measurement of a surface, comprising
a coherent light source emitting an electromagnetic beam;
two beam splitters;
two diaphragms;
two multiple mirrors with two distanced mirrors, each comprising a first mirror to which the incoming beam hits first, and a second mirror at which the beam is reflected last, wherein the mirrors are superimposed in the direction of motion of the first wavefront and wherein the first mirror is partially transparent for the electromagnetic beam and the second mirror is fully reflective; and
whereby the beam splitters and the multiple mirror are arranged in such a manner that the electromagnetic beam hits the first beam splitter, is divided by the first beam splitter in two partial beams with different propagation directions and each partial beam is directed to one of the multiple mirrors and then both partial beams meet the second beam splitter,
wherein one diaphragm is arranged in each of the beam paths between the two beam splitters in such a manner that each partial beam passes through one of the diaphragms, and
wherein a mirror of the multiple mirror is tiltable compared to the other mirror in such a manner that the mirrors enclose an angle and that a wavefront hitting the multiple mirror is divided into two outgoing wavefronts that are phase-shifted with respect to each other.

* * * * *